Nov. 23, 1965  W. KENYON  3,219,297
POWER ACTUATED HARNESS RESTRAINT
Filed July 22, 1963  4 Sheets-Sheet 2

INVENTOR.
WILFRED KENYON
BY
*George C. Sullivan*
Agent 3,219,297
POWER ACTUATED HARNESS RESTRAINT
Wilfred Kenyon, Santa Monica, Calif., assignor to Lockheed Aircraft Corporation, Burbank, Calif.
Filed July 22, 1963, Ser. No. 296,606
15 Claims. (Cl. 244—122)

This invention relates to a power actuated harness restraint and more particularly to such a restraint which may be worn by drivers of vehicles, pilots of aircraft or other seat occupants to automatically return a seat occupant to a safe position in his seat when the occupant is subjected to a predetermined "G" force or acceleration.

It has long been a problem to prevent injury to occupants of seats in vehicles when the vehicle is suddenly subjected to a substantial "G" force, while not unduly restricting the freedom of movement of the occupant under normal conditions.

One prior art apparatus for restraining seat occupants when the vehicle in which they are riding is suddenly subjected to a "G" force above a predetermined level comprises an inertia reel which reacts to "G" forces by restraining further movement of the occupant. While generally satisfactory, inertia reels have the disadvantage that they do not retract the seat occupant to a safe position against the seat, but leave the seat occupant in whatever position he was in when subjected to the "G" force. Thus, the occupant may be damaged by contact with vehicle structure or other items in the vehicle.

Another disadvantage resides in the fact that inertia reels do not provide a positive restraint on an occupant in a vehicle.

In view of the foregoing factors and conditions characteristic of mechanisms for restraining a seat occupant in a vehicle, it is a primary object of the present invention to provide a new and useful power actuated harness restraint for seat occupants not subject to the disadvantages enumerated above and having a power actuated mechanism especially designed for returning a seat occupant to a safe position with a harness tightness, which may be preselected by the occupant, efficiently, safely and expeditiously when the occupant is subjected to a "G" force exceeding a predetermined level.

Another object of the present invention is to provide a new and improved multi-directional accelerometer.

Yet another object of the present invention is to provide a power actuated harness restraint mechanism which will automatically release a seat occupant for free movement in a vehicle under normal conditions and which will also restrain the seat occupant against the seat when subjected to a predetermined "G" force.

A further object of the present invention is to provide a power actuated harness restraint which will protect the pilot of an aircraft during high accelerations by keeping him safely positioned in his seat.

A still further object of the present invention is to provide a new and improved multi-directional "G" sensing device which automatically activates a harness restraining mechanism when the sensing device is subjected to an acceleration above a predetermined amount.

Another object of the present invention is to provide a powered system for the seat occupant of an aircraft which will allow the occupant to adjust the tightness of the frontal torso harness by the actuation of a suitable control which, when the desired tightness is achieved in the frontal torso harness, will retain this input and cause the system to return to this position during high acceleration maneuvers and upon actuation of an escape system.

According to the present invention, a multi-directional "G" sensor or accelerometer acts as a sensing and activating device for a power actuated harness restraint mechanism. In general, the "G" sensor consists of a frame having a universal joint housing mounted therein. A universal ball joint is rotatably mounted within the housing in such a manner that it is free to rotate in any direction. A weighted ball is attached to the universal ball with an arm so that, as the weighted ball moves, it causes the universal ball to rotate. The weighted ball is held in position by retaining springs which are supported within the frame. When the weighted ball senses a "G" force, it moves against the retaining springs overcoming their bias to cause rotation of the universal ball. As this ball rotates, it moves an attached switch activating arm which, in turn, activates an associated microswitch. The microswitch, when activated, energizes a solenoid retracting a plunger. Retraction of the plunger permits high pressure fluid to flow to a harness restraining mechanism.

The harness restraining mechanism is a cylinder-piston type device utilizing a high pressure fluid as its actuating medium. Prior to operation, the mechanism is preset to a desired position which adjusts the tightness of the harness on a seat occupant. This adjustment is accomplished with a reversible electric motor which is mounted on the mechanism housing and rotates a driving pinion which, in turn, engages a tightness adjustment gear. The adjustment gear is internally threaded so that it engages a screw set on the outer periphery of the actuating cylinder, causing it to move linearly. It is this movement which, because the cylinder is coupled to a cable drum drive pinion, tightens or loosens an occupant's harness by winding a cable attached thereto about the cable drum or unwinding it, as the case may be.

After adjustment, and regardless of the position of the seat occupant, introduction of high pressure fluid through the system when the solenoid plunger is retracted causes the harness to retract to the preset position. Means are provided for manually locking and unlocking the mechanism in its retracted position so that a seat occupant may be restrained or free to move, as desired. A constant tension is maintained on the seat occupant's harness when not restrained by the restraining mechanism by a negator spring which maintains a constant tension on the harness by keeping all slack out of the cable associated therewith.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
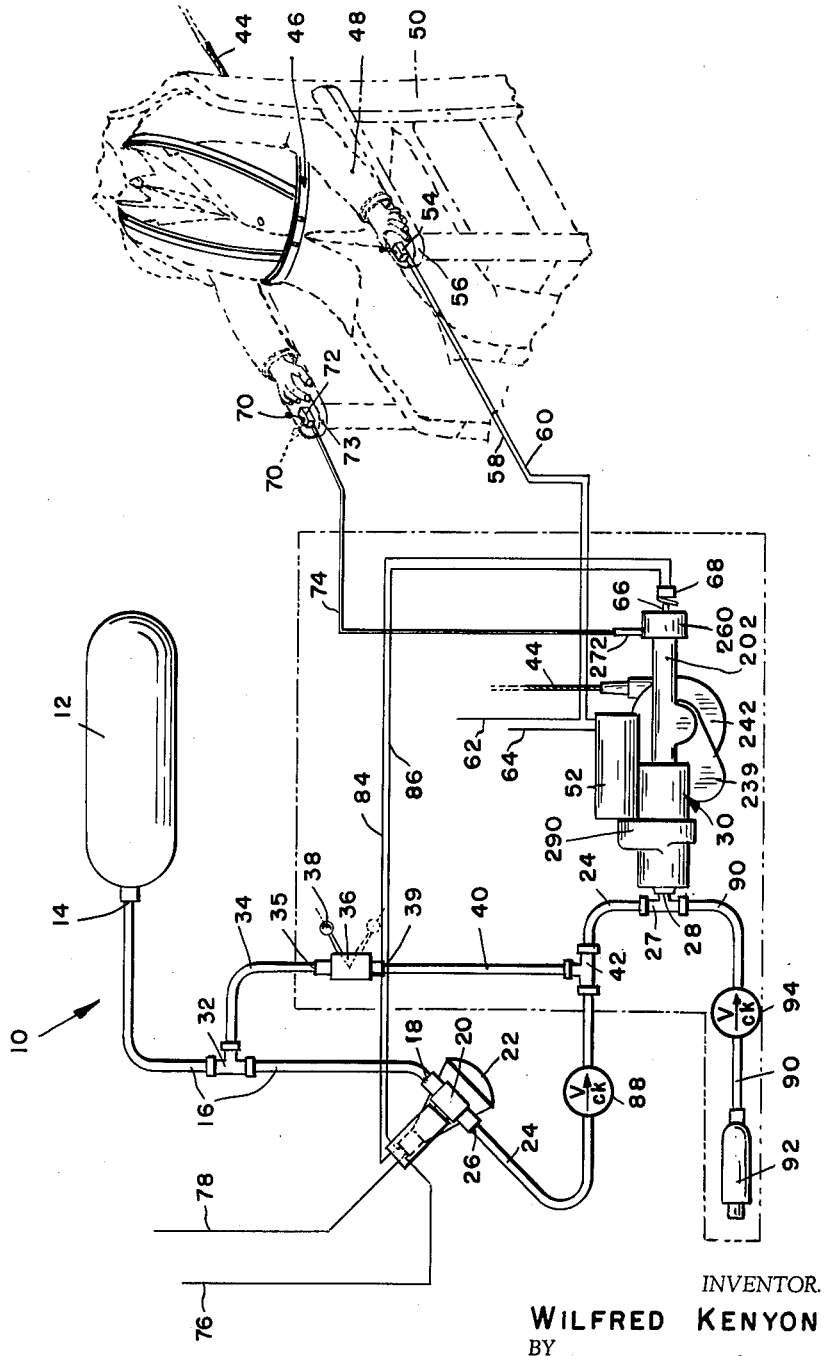
FIGURE 1 is a schematic view of the power actuated harness restraint of the present invention connected to a seat occupant.

Referring again to the drawings and more particularly to FIGURE 1, the power actuated harness restraint mechanism constituting the present invention, generally designated 10, includes a storage tank 12 containing a suitable fluid, such as air, under pressure. Fluid flows from the tank 12 through an outlet port 14 and a first header 16 into inlet port 18 of a solenoid-type valve 20 forming part of a "G" sensing device or accelerometer 22. A second header 24 is connected to the outlet port 26 of valve 20 and carries fluid under pressure from valve 20 to a T-fitting 27 mounted in the inlet port 28 of a harness restraining mechanism 30. As will become apparent hereinafter, the header 24 must have sufficient flexibility to permit limited lateral movement of T-fitting 27 and port 28.

A T-fitting 32 is connected in the first header 16 to conduct fluid from the header 16 through a branch line 34 to the inlet port 35 of a normally closed, manual valve 36. The valve 36 includes an actuating lever 38 which, in the position shown in full lines, prevents flow of fluid through the valve 36 and in the position shown in broken lines, permits fluid to flow through outlet port 39 and a branch line 40 into a T-fitting 42 which is mounted in the second header 24. Fluid flows under pressure from T-fitting 42 in the second header 24, T-fitting 27 and inlet port 28 into the restraining mechanism 30.

When restraining mechanism 30 is pressurized by the fluid flow through header 24, a cable 44, which is connected to the harness 46 of a seat occupant 48, is retracted pulling the occupant 48 tightly against seat 50. A reversible, electric motor 52 is mounted on the restraining mechanism 30 and operates through means to be hereinafter described to control the amount of retraction of cable 44 to pull the occupant 48 against the seat 50 a predetermined amount, which may be selected by the occupant 48 by actuating an electrical switch 54 which is illustrated as mounted on the left hand arm rest 56 of seat 50 and which is connected to motor 52 through electrical leads 58 and 60 and to a source of electrical power, not shown, through leads 62 and 64.

The restraint mechanism 30 has a predetermined stroke and travels the full length of the stroke each time fluid under pressure is admitted to inlet port 28. When the mechanism 30 reaches the end of its stroke, a contact 66 engages a normally closed microswitch 68 to open it and de-energize valve 20 to interrupt the flow of fluid to the mechanism 30. The mechanism 30 then maintains the cable 44 in its retracted position, through means to be hereinafter described, even though fluid under pressure is not being supplied to the mechanism 30. Thus, a substantial saving of fluid under pressure may be brought about by having the microswitch 68 interrupt the flow of fluid while the mechanism 30 still restrains the harness 46. Restraint on the occupant 48 may be released by moving the actuating lever 70 of a releasing mechanism 72 from the position shown in full-lines to the position shown in broken lines in FIGURE 1. The releasing mechanism 72 may be mounted on the right hand arm rest 73 of seat 50 and a cable 74 connects lever 70 to the mechanism 30.

Electrical leads 76 and 78 connect the solenoid 80 of the solenoid actuated valve 20 to a source of electrical power, not shown, through a normally open microswitch 82. When the accelerometer 22 is subjected to a predetermined "G" force, the microswitch 82 is closed to energize solenoid 80 and open valve 20 permitting fluid pressure to flow through outlet port 26 and header 24 into the inlet port 28 of the restraint mechanism 30. The microswitch 68 is connected to solenoid 80 by means of electrical leads 84 and 86 and de-energizes solenoid 80 to close valve 20 when contact 66 engages the microswitch 68.

A check valve 88 is inserted in the header 24 upstream of the T-fitting 42 so that fluid under pressure will not flow upstream thereof when the valve 36 is positioned manually to permit flow into the restraint mechanism 30 through inlet port 28. A branch line 90 connects T-fitting 27 to a conventional gas generator 92 forming part of an ejection system, not shown, designed to eject the seat 50. A check valve 94 is inserted in the branch line 90 downstream of the port 28 to prevent fluid flowing in header 24 upstream thereof from passing downstream into the gas generator 92. The check valve 94 will, however, permit fluid under pressure flowing from the gas generator upon actuation of the ejection controls, not shown, to pressurize the restraining mechanism to secure the occupant 48 securely in his seat 50 upon ejection of the seat 50.

Figure 2:
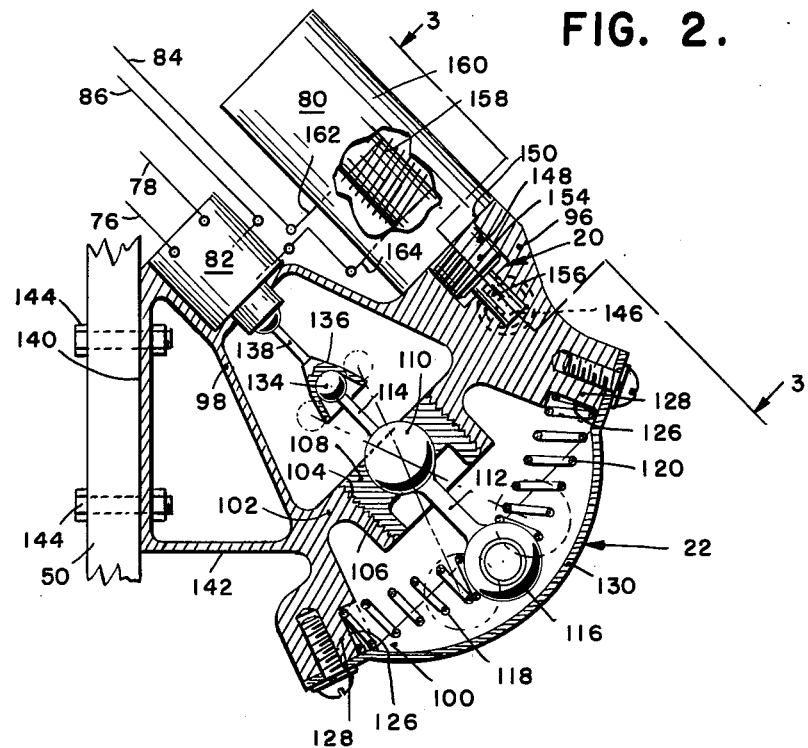
FIGURE 2 is a vertical, cross-sectional view of a sensing mechanism employed with the system of FIGURE 1.
Figure 3:
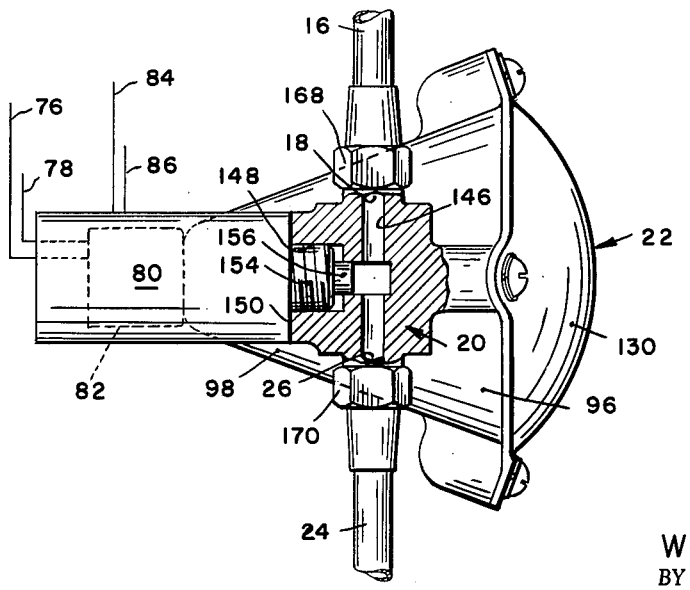
FIGURE 3 is a cross-sectional view, with parts shown in elevation, taken along line 3—3 of FIGURE 2.

Referring now to FIGURES 2 and 3, the accelerometer 22 includes a housing 96 having a generally bell-shaped, top portion 98, an open bottom 100 and a partition 102. The partition 102 has internal threads 104 which are threadedly engaged by the external threads 106 of a socket member 108. A ball 110 is rotatably mounted in socket 108 and includes arms 112 and 114. The arm 112 extends into the open bottom 100 and carries a spherical weight 116 at its end remote from ball 110. The weight 116 is biased into a neutral position by means of representatively illustrated compression springs 118 and 120. Each of these springs has one of its ends engaging weight 116 and its other end seated in a recess 126 formed in an encompassing sidewall 128. Although only two springs are specifically illustrated it is to be understood that at least four such springs disposed equally about weight 116 are provided. Larger numbers may be provided if so desired. Further reference to springs 118 and 120 will also refer to all other springs so disposed. The open bottom 100 is closed with a cover 130 which may be screw retained to the sidewall 128. The arm 114 extends into the bell-shaped portion 98 of housing 96 and carries a spherical member 134 which forms an articulated connection with a socket member 136. The socket member 136 forms one end of a toggle 138 which actuates the microswitch 82 upon slight displacement in any direction.

Mounting faces 140 and 142 are formed on the housing 96 for mounting the accelerometer 22 on a vehicle and are disposed at right angles to each other so that two accelerometers may be mounted at right angles to each other in a vehicle, if desired. The accelerometer 22 is shown for purposes of illustration, but not of limitation, as being mounted on the seat 50 with the mounting face 140 engaging the seat 50 and is secured in position thereon by means of bolts 144.

The solenoid actuated valve 20 may be cast as an integral part of housing 96 and includes a fluid conducting passageway 146 placing its inlet port 18 in fluid communication with its outlet port 26. An internally threaded bore 148 communicates between the passageway 146 and a surface 150 on valve 20. The solenoid 80 has an externally threaded boss 154 which threadedly engages the surface 150 in such a manner that the plunger 156 of solenoid 80 bottoms in bore 148 to close passageway 146 in its normally extended position, as shown in FIGURE 2, and is withdrawn to the position shown in FIGURE 3 to open passageway 146 when solenoid 80 is energized. The plunger 156 forms the core of solenoid 80 and extends into a coil 158 mounted in a solenoid housing member 160. An electrical lead 162 connects coil 158 to the lead 84 on microswitch 68 (FIGURE 1) which, in turn, is connected to the microswitch 82 through lead 86 in such a manner that microswitch 68 must be closed to complete a circuit to coil 158 through lead 76, microswitch 82, lead 164, coil 158, lead 162, lead 84, microswitch 68, lead 86, microswitch 82 and lead 78.

The structure surrounding inlet port 18 and the outlet port 26 are externally threaded and flanged fittings 168 and 170 connect the first header 16 and the second header 24 to the ports 18 and 26, respectively.

The energy stored in compressed springs 118 and 120 to sufficient to maintain the weight 116 in its neutral position until it is subjected to a "G" force or acceleration exceeding a predetermined amount from any direction, so long as it is not applied directly along the axis of the arm 112. Responsive to this "G" force the weight 116 is deflected from its neutral position, causing ball 110 to rotate sufficiently in socket member 108 that arm 114, operating through ball 134 and socket 136, displaces toggle 138 sufficiently to close microswitch 82. This completes the circuit to solenoid 80, thereby energizing coil 158 and retracting plunger 156 so that the passageway 146 is open to the flow of fluid from the inlet port 18 to the outlet port 26 and, thence, to the restraint mechanism 30, as explained in connection with FIGURE 1.

Figure 4:
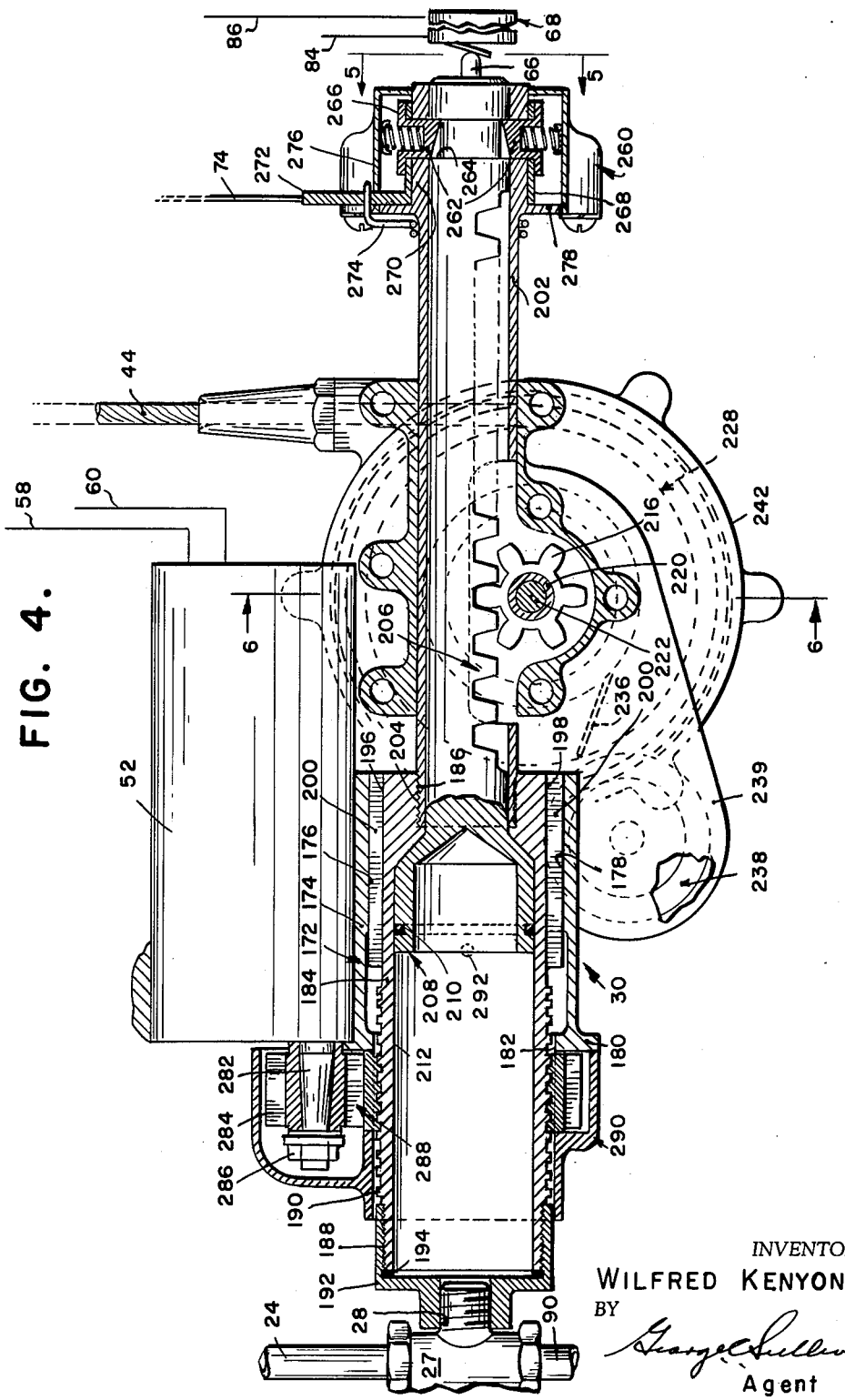
FIGURE 4 is a longitudinal, cross-sectional view of the power actuated harness restraint mechanism used in the system of FIGURE 1.
Figure 5:
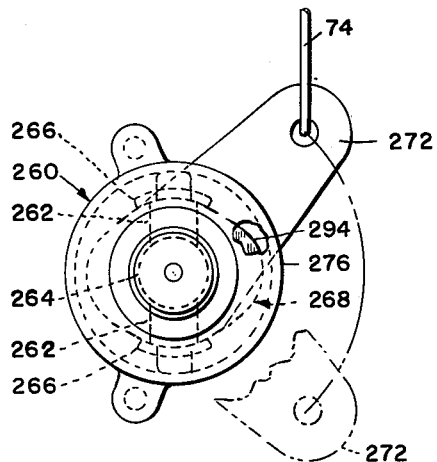
FIGURE 5 is an end view taken along line 5—5 of FIGURE 4.
Figure 6:
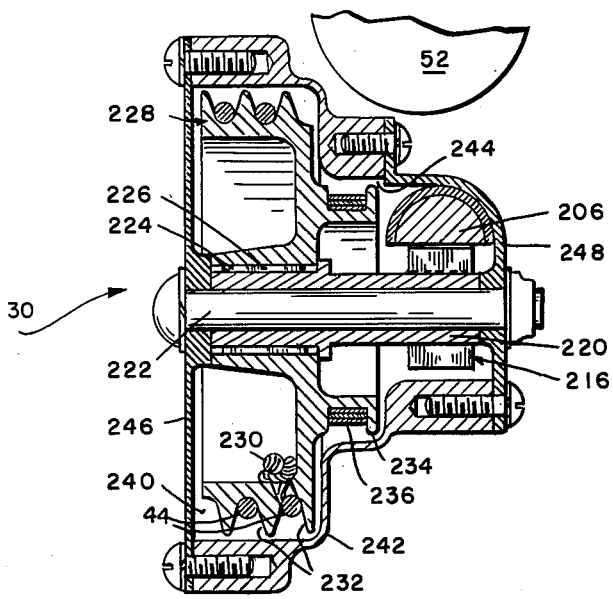
FIGURE 6 is a vertical, cross-sectional view taken along line 6—6 of FIGURE 4.

Referring to FIGURES 4, 5 and 6, the restraint mechanism 30 includes a housing member 172 having an encompassing sidewall 174 on the inside surface of which slots 176 and 178 are formed parallel with the longitudinal axis of housing 172. An annular flange 180 is formed at one open end 182 of housing member 172. A fluid pressure cylinder 184 is mounted in housing 172 and extends out the open top 182. The cylinder 184 has an internally threaded end 86, an externally threaded end 188 and a set of screw threads 190 intermediate its ends. An internally threaded cap 192 includes the inlet port 28, threadedly engages the externally threaded end 188 and is sealed in fluid tight relationship with the cylinder 184 by means of a resilient, annular seal 194. Slots 196 and 198, which correspond to the slots 176 and 178 in sidewall 174, are formed on the cylinder 184 parallel to its longitudinal axis so that the housing 172 and the cylinder 184 may be keyed together by means of keys 200 which prevent relative rotation between the housing 172 and the cylinder 184 while permitting linear movement between them. A rack housing 202 includes an externally threaded end 204 which threadedly engages the internally threaded end 186 of cylinder 184. A rack 206 is slidably mounted in the rack housing 202 and connected to a piston 208, which is slidably mounted in the cylinder 184. An O-ring seal 210 encompasses the piston 208 and forms a wiping contact with the inner wall 212 of cylinder 184. The teeth of rack 206 engage a pinion gear 216, which may be rigidly affixed by any suitable means to a hollow shaft 220. The shaft 220 is rotatably mounted on a stud 222 and includes a splined end 224 engaging the spline 226 of a cable drum 228. The cable 44 is anchored to the cable drum 228 by means of a knot 230 or appropriate retaining means and is wound about drum 228 in grooves 232 formed on the outer periphery thereof when pinion 216 is rotated in a clockwise direction, as viewed in FIGURE 6. The cable drum 228 includes an integral pulley 234 which carries a conventional negator spring 236 which, in turn, cooperates with a drum 238, mounted in a housing 239, to keep the slack out of cable 44.

The drum 228 is mounted in the cavity 240 of a housing member 242 having an opening 244 through which the hollow shaft 220 and the stud 222 extend and in which the pinion 216 and the rack 206 are mounted. The cavity 240 and opening 244 are closed by covers 246 and 248, respectively, and are secured by a series of screws.

The end of the rack housing 202, which is remote from the end 204, carries a rack-locking mechanism 260 including a pair of spring biased detents 262 engageable with an annular groove 264 formed in the end of rack 206 to lock the rack in its extended position, as shown in FIGURE 4. The detents 262 includes flanges 266 riding upon an annular cam member 268 encompassing a boss member 270 on the end of rack housing 202 and having a lever 272 which is connected to the cable 74 and is biased to a predetermined neutral position by means of a spring 274. The cam 268 and detent means 262 are housed in a cover member 276 which is screw retained to an annular flange 278 at the base of boss member 270. The contact 66, which opens microswitch 68, is mounted on the end of rack 206.

The motor 52 has a shaft 282 to which a driving pinion 284 is rigidly affixed for rotation by a spline or similar device and is secured by means of a nut 286. The pinion 284 is in driving engagement with a driven pinion 288 which is internally threaded and engages the screw threads 190 on cylinder 184 and which is restrained from linear movement by flange 180 and a cover member 290 secured thereto. Since the cylinder 184 is restrained from rotating by means of keys 200 and since the driven pinion 288 is restrained from linear motion, rotation of pinion 288 by pinion 284 in one direction moves the cylinder 184 and the rack housing 202 to the right, as viewed in FIGURE 4. When the motor 52 is reversed to rotate the pinion 284 in the opposite direction, the cylinder 184 and rack housing 202 will move to the left, as viewed in FIGURE 2. When the rack 206 is moved to its full stroke to the right, where it is locked against further movement by the detent means 262 engaging groove 264, as shown in FIGURE 2, linear movement of cylinder 184 and rack housing 202 will also cause linear movement of the rack 206, causing pinion gear 216 to rotate. Thus, the seat occupant 48 can actuate switch 54 on arm 56 (FIGURE 1) after the harness 46 and cable 44 are attached to the occupant and adjust the cable 44 to any desired tension, which will represent the amount of restraint imparted by the restraining mechansm 30 when it is subsequently actuated by fluid under pressure flowing through inlet port 28 into cylinder 184 to pressurized piston 208 and drive the rack 206 to the locked position shown in FIGURE 2. As soon as the rack 206 becomes locked in this position, the contact 66 will engage microswitch 68 to break the circuit to coil 158 and de-energize solenoid 80, seating plunger 156 to the bottom of bore 148 so that the flow of pressure fluid through passageway 146 is terminated and thereby interrupting flow through inlet port 28. The pressure fluid in cylinder 184 then escapes to atmosphere through a small vent 292 mounted in the sidewall 212 of cylinder 184. When it is desired to release the restraint caused by the retraction and tensioning of cable 44, the occupant 48 moves lever 70 from the position shown in solid lines to the position shown in broken lines in FIGURE 1. This transmits a force through cable 74 to lever 272 on cam 268, rotating it until the cam faces 294 engaging the flanges 266, to unseat the detent means 262 from groove 264. Then as the occupant 48 moves about in seat 50, extending cable 44, drum 228 and pinion 216 are rotated to move the piston and rack assembly to the left, as viewed in FIGURE 2.

Operationally, assume that the occupant 48 has leaned forward in the seat 50 sufficiently to rotate pinion 216 in a counter clockwise direction (FIGURE 4), moving rack 206 and piston 208 to the left to the end 188 of cylinder 184. Should the seat 50 then be subjected to a sudden acceleration, the weight 116 in accelerometer 22 will overcome the bias of springs 118 and 120, depending on the direction of the force, swinging arm 112 from its neutral position, causing ball 110 to rotate in socket 108 and thereby energizing solenoid 80, as hereinbefore described. This withdraws plunger 156 from passageway 148 permitting fluid under pressure to flow from tank 12 through the first header 16, valve 20, the second header 24 and inlet port 28 into cylinder 184, pressurizing piston 208 and moving it to the right to the end of its stroke. Piston 208 drives rack 206 to the right causing pinion 216 to rotate in a clockwise direction. As pinion 216 rotates, it rotates cable reel 228 winding cable 44 into grooves 232 so as to retract cable 44 and pull the occupant 48 back against seat 50. As the rack 206 reaches the right hand end of its stroke, the detent means 262 engage annular groove 264 locking the rack 206. Simultaneously, contact 66 engages microswitch 68, opening it and de-energizing solenoid 80. This seats plunger 156 in passageway 148 to interrupt the flow of pressure fluid to the cylinder 184. The cylinder 184 then vents to atmosphere through orifice 292.

At the end of the accelerating force on seat 50, the weight 116 is returned to its neutral position by the springs 118 and 120 opening switch 82 to break the electrical circuit to solenoid 80. The occupant 48 may then actuate lever 70 to release detent means 262 so that the occupant 48 is again free to move about in seat 50. Any movement of occupant 48 will bring contact 66 out of engagement with microswitch 68, closing the leg of the circuit to solenoid 80 through leads 84, 86, and 162. The solenoid 80 is thereby reset to be energized by the closing of switch 82 when accelerometer 22 is again subjected to an acceleration exceeding the pre-load of springs 118 and 120. As the occupant 48 moves about in seat 50, the negator spring 236 maintains the cable 44 taut by winding it about drum 228.

While the particular power actuated harness restraint herein shown and described in detail is fully capable of attaining the objects and providing the advantages hereinbefore stated, it is to be understood that it is merely illustrative of the presently preferred embodiment of the invention and that no limitations are intended to the details of the construction or design herein shown other than as defined in the appended claims.

What is claimed is:

I claim:

1. A power actuated harness restraint for restraining the occupant of a vehicle seat in a seated position comprising:
    (a) harness means for orientation upon the occupant, said harness means being tensionable to restrain the occupant in the seat;
    (b) retractable means connected to said harness means for forcing the occupant into a seated position when the occupant is subjected to an acceleration exceeding a predetermined level; and
    (c) accelerometer means connected to said retractable means for actuating said retractable means to tension said harness means when the occupant is subjected to such excessive acceleration.

2. A power actuated harness restraint for restraining the occupant of a vehicle seat into a seated position comprising:
    (a) harness means positioned upon the occupant, said harness means being tensionable to restrain the occupant in the seat;
    (b) retractable means connected to said harness means for forcing the occupant into a seated position when the occupant is subjected to an acceleration exceeding a predetermined level;
    (c) accelerometer means connected to said retractable means for actuating said retractable means to tension said harness means when the occupant is subjected to the excessive acceleration; and
    (d) pretensioning means connected to said retractable means for adjusting said retractable means so that said harness means is tensioned a predetermined amount each time said retractable means is actuated by said accelerometer means.

3. A power actuated harness restraint for restraining the occupant of a vehicle seat into a seated position comprising:
    (a) harness means upon the occupant, said harness means being tensionable to restrain the occupant in the seat;
    (b) retractable means connected to said harness means for forcing the occupant into a seated position when the occupant is subjected to an acceleration exceeding a predetermined level;
    (c) accelerometer means connected to said retractable means for actuating said retractable means to tension said harness means when the occupant is subjected to said excessive acceleration;
    (d) pretensioning means connected to said retractable means for adjusting said retractable means so that said harness means is tensioned a predetermined amount each time said retractable means is actuated by said accelerometer means; and
    (e) means connecting siad retractable means to seat ejection means in such a manner that seat ejection means will actuate said retractable means upon actuation of the seat ejection means.

4. A power actuated harness restraint for restraining the occupant of a vehicle seat comprising:
    (a) harness means upon the occupant, said harness means being tensionable to restrain the occupant in the seat;
    (b) retractable means connected to said harness means for tensioning said harness means when the occupant is subjected to an acceleration exceeding a predetermined level;
    (c) accelerometer means connected to said retractable means for actuating said retractable means to tension said harness means when the occupant is subjected to the excessive acceleration;
    (d) pretensioning means connected to said retractable means for adjusting said retractable means so that said harness means is tensioned a predetermined amount each time said retractable means is actuated by said accelerometer means;
    (e) means connecting said retractable means to seat ejection means in such a manner that said seat ejection means will actuate said retractable means upon actuation of said seat ejection means; and
    (f) manually operable by-pass means connecting said retractable means in a circuit which is separated from said accelerometer means for by-passing said accelerometer means to actuate said retractable means.

5. A power actuated harness restraint for restraining the occupant of a vehicle seat comprising:
    (a) harness means upon the occupant, said harness means being tensionable to restrain the occupant in the seat;
    (b) retractable means connected to said harness means for tensioning said harness means when the occupant is subjected to an acceleration exceeding a predetermined level;
    (c) accelerometer means connected to said retractable means for actuating said retractable means to tension said harness means when the occupant is subjected to said excessive acceleration;
    (d) pretensioning means connected to said retractable means for adjusting said retractable means so that said harness means is tensioned a predetermined amount each time said retractable means is actuated by said accelerometer means;
    (e) means connecting said retractable means to seat ejection means in such a manner that said seat ejection means will actuate said retractable means upon actuation of said seat ejection means;
    (f) manually operable by-pass means connecting said retractable means in a circuit which is separated from said accelerometer means for by-passing said accelerometer means to actuate said retractable means; and
    (g) manually operable release means connected to said retractable means for releasing said retractable means to untension said harness means.

6. A power actuated harness restraint for restraining the occupant of a vehicle seat comprising;
    (a) harness means upon the occupant, said harness means being tensionable to restrain the occupant in the seat;
    (b) a pressurizable piston;
    (c) means connecting a cable to said piston and to said harness means, said piston being moved when pressurized to shorten said cable;
    (d) means for pressurizing said piston; and
    (e) accelerometer means coupled to the pressurizing means for operating the pressurizing means when subjected to a predetermined acceleration.

7. A power actuated harness restraint for restraining the occupant of a vehicle seat into a seated position comprising;
    (a) harness means upon the occupant, said harness means being tensionable to restrain the occupant in the seat;
    (b) retractable means connected to said harness means for forcing the occupant into a seated position when the occupant is subjected to an acceleration exceeding a predetermined level; and (c) accelerometer means connected to said retractable means for actuating said retractable means to tension said harness means when said occupant is subjected to the excessive acceleration; and (d) means connecting said retractable means to seat ejection means in such a manner that the seat ejection means will actuate said retractable means upon actuation of the seat ejection means.

8. A power-actuated harness restraint mechanism for restraining the occupant of a vehicle seat comprising:

a harness for the occupant,
the harness being tensionable to restrain the occupant by pulling the occupant against the seat when the occupant is subjected to a predetermined acceleration;
rack and pinion means connected to the harness for tensioning the harness when the rack and pinion means are actuated;
actuating means connected to the rack and pinion means for actuating the rack and pinion means when the actuating means is subjected to the predetermined acceleration;
the actuating means includes:
a piston connected to the rack and pinion means;
a source of fluid under pressure connected to the piston for pressurizing the piston to actuate the rack and pinion means;
valve means connected in a circuit from the fluid source to the piston to control the flow of the fluid thereto; and
an accelerometer connected to the valve means for opening the valve means when the accelerometer is subjected to the predetermined acceleration.

9. The device of claim 8 including means connected to said valve means for interrupting the flow of said fluid to said piston as soon as said rack and pinion means has been actuated.

10. A power actuated harness restraint mechanism for restraining the occupant of a vehicle seat comprising:

(a) a harness for the occupant, said harness being tensionable to restrain the occupant in said seat by pulling the occupant against said seat when the occupant is subjected to a predetermined acceleration;

(b) a cable connected to said harness;

(c) a drum connected to said cable for shortening said cable by winding said cable about said drum when it is rotated, said drum including a pinion adapted to be rotated to rotate said drum;

(d) a rack mounted in driving engagement with said pinion for rotating said pinion;

(e) a pressurizable cylinder mounted in alignment with said rack, said cylinder having an inlet port;

(f) a piston slidably mounted in said cylinder in fluid communication with said inlet port, said piston being rigidly connected to said rack to drive said rack to the end of its stroke when said cylinder is pressurized;

(g) a source of fluid under pressure connected to said inlet port for pressurizing said cylinder;

(h) a solenoid operated valve connected in a circuit from said fluid source to said inlet port for interrupting flow of fluid to said inlet port when said solenoid is de-energized and for permitting flow of fluid to said inlet port when said solenoid is energized;

(i) a normally-open electrical switch connected to said solenoid for energizing said solenoid when said switch is closed, and (j) an accelerometer connected to said switch for closing same when said accelerometer is subjected to the predetermined acceleration.

11. The device of claim 10 including means for locking said rack at the end of its stroke after it has been actuated by said fluid.

12. The device of claim 11 including a normally closed electrical switch mounted adjacent said rack for engagement thereby when said rack reaches the end of its stroke to open said switch, said switch being connected to a solenoid and being adapted to de-energize said solenoid when said second switch is opened by said rack.

13. The device of claim 12 including orifice means mounted in said cylinder for de-pressurizing said cylinder when said rack engages said second switch.

14. The device of claim 13 including a gas generator for ejecting the seat, and a conduit connecting said gas generator to said inlet port for pressurizing said cylinder when the seat is ejected.

15. The device of claim 13 including a reversible electric motor connected to said rack for adjusting the length of stroke of said rack, whereby the tension on said harness may be adjusted to a preselected value so that the occupant is pulled against the seat a predetermined amount when said rack is driven to the end of its stroke.

References Cited by the Examiner

UNITED STATES PATENTS

| | | | |
|---|---|---|---|
| 2,569,638 | 10/1951 | Martin | 244—122 |
| 3,052,432 | 9/1962 | Martin | 244—122 |
| 3,064,483 | 11/1962 | Laubenfels | 73—514 |
| 3,065,027 | 11/1962 | Misslich et al. | 297—388 |
| 3,077,324 | 2/1963 | Strickland | 244—122 |
| 3,089,342 | 5/1963 | Willis | 73—514 |
| 3,105,662 | 10/1963 | Wrighton | 244—122 |
| 3,107,121 | 10/1963 | Mougey | 297—388 |

MILTON BUCHLER, *Primary Examiner.*

FRANK B. SHERRY, FERGUS S. MIDDLETON,
*Examiners.*